No. 750,432. PATENTED JAN. 26, 1904.
H. CASLER & J. A. PROSS.
COIN CONTROLLED DEVICE FOR EMBOSSING STRIPS OF METAL, &c.
APPLICATION FILED OCT. 2, 1901.

NO MODEL. 6 SHEETS—SHEET 1.

Witnesses
Raphaël Netter
Eugène L. Guérin

Herman Casler, Inventors
and John A. Pross
by ........ Att'ys

No. 750,432. PATENTED JAN. 26, 1904.
H. CASLER & J. A. PROSS.
COIN CONTROLLED DEVICE FOR EMBOSSING STRIPS OF METAL, &c.
APPLICATION FILED OCT. 2, 1901.
NO MODEL. 6 SHEETS—SHEET 2.

Witnesses
Raphaël Netter
Eugène L. Guérin

Herman Casler, Inventors
and John A. Pross
by [signature] Att'ys.

No. 750,432. Patented January 26, 1904.

UNITED STATES PATENT OFFICE.

HERMAN CASLER AND JOHN A. PROSS, OF CANASTOTA, NEW YORK, ASSIGNORS TO SIMPLEX MANUFACTURING COMPANY, OF NEW YORK, N. Y., A CORPORATION OF NEW JERSEY.

COIN-CONTROLLED DEVICE FOR EMBOSSING STRIPS OF METAL, &c.

SPECIFICATION forming part of Letters Patent No. 750,432, dated January 26, 1904.

Application filed October 2, 1901. Serial No. 77,339. (No model.)

*To all whom it may concern:*

Be it known that we, HERMAN CASLER and JOHN A. PROSS, both citizens of the United States, residing at Canastota, in the county of Madison and State of New York, have invented certain new and useful Improvements in Coin-Controlled Devices for Embossing Strips of Metal, &c., of which the following is a specification, reference being had to the drawings accompanying and forming a part of the same.

Figures 3, 8, 9, 10:
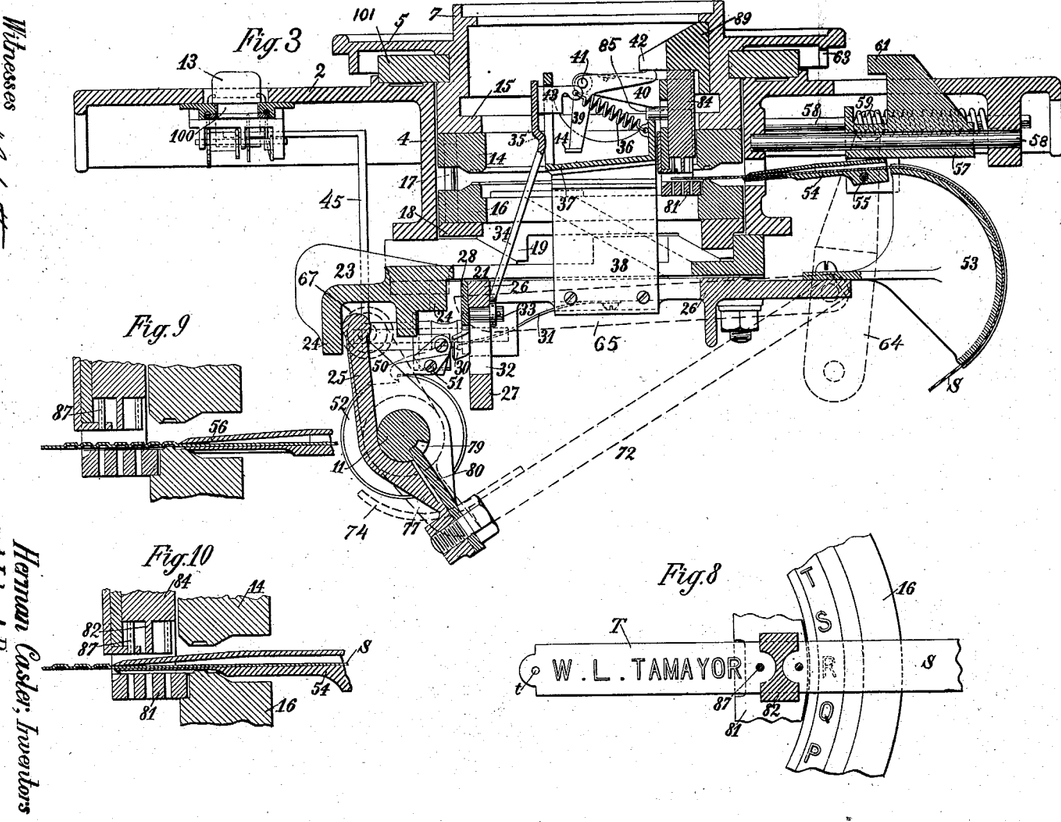
Figs. 3, 4, and 5 are central vertical sectional views each taken on the line 3 3 of Fig. 2, the parts in these views being represented in the different positions which they occupy at different times during the cycle of operations.
Fig. 8 is a detail horizontal sectional view illustrating the cut-off dies.
Figs. 9 and 10 are enlarged detail sectional views representing parts of the feeding mechanism for the metallic strip, the printing or embossing dies, and the cut-off dies.

Our invention has for its object to produce a machine by means of which a metallic name-plate, like that represented in Figure 8, may be produced.

The invention consists in various improvements in mechanism for producing such a plate.

The invention is adapted to be used in connection with an automatic vending-machine or coin-controlled apparatus, and we have shown it combined and associated with a mechanism of this kind; but it is apparent that certain features of the invention are not limited to the combination with such a vending mechanism.

In the accompanying drawings.

Figure 1:
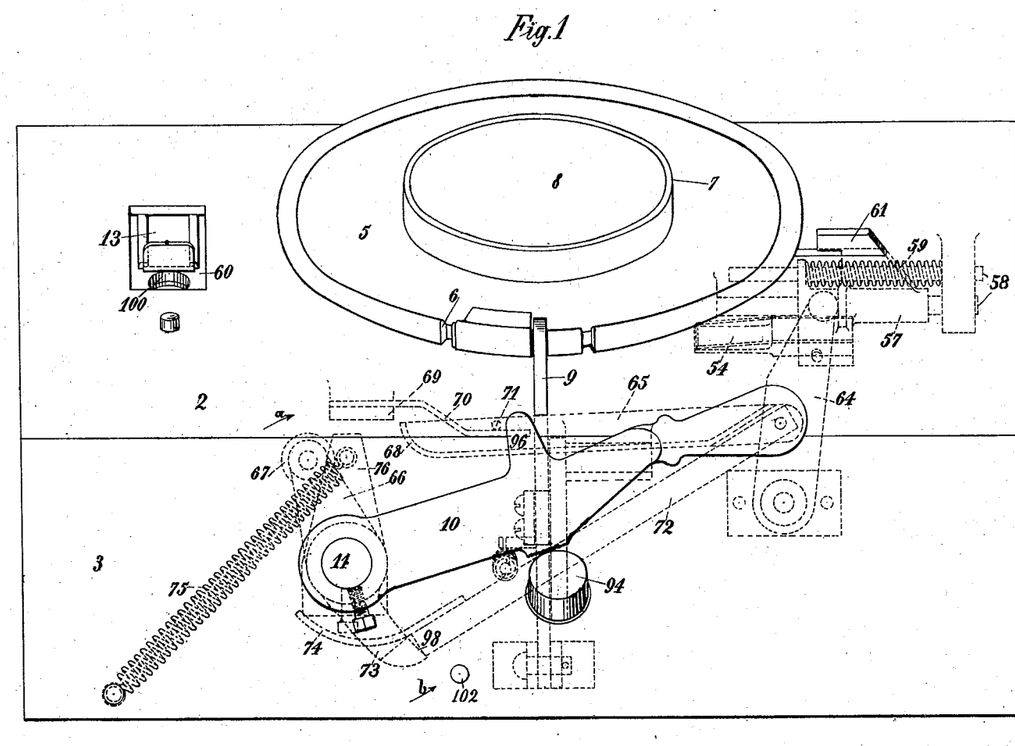
Fig. 1 is a front view of an apparatus embodying our invention, the supporting case or stand upon which the mechanism is mounted being in this and the other views entirely omitted.
Figure 2:
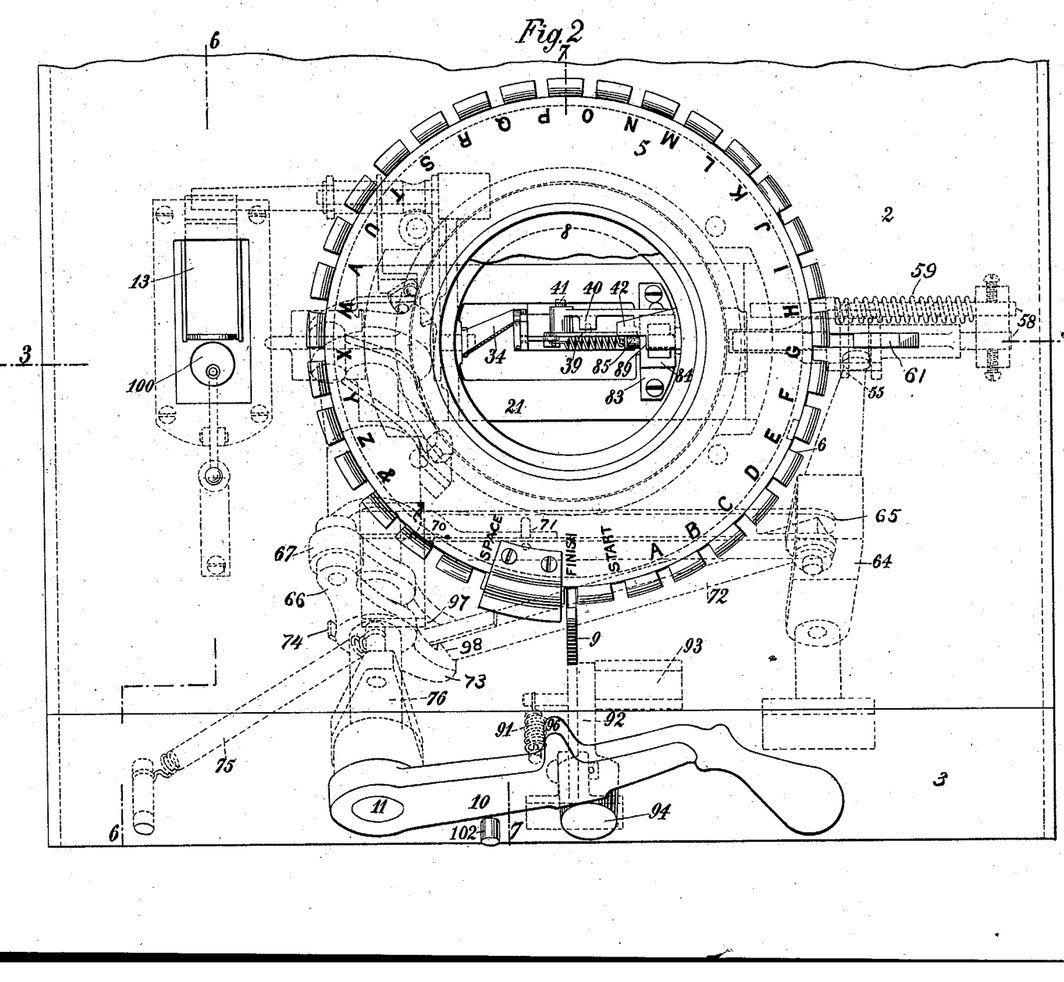
Fig. 2 is a plan view of the same when situated in a position with the rotatable setting-wheel in a plane at right angles to the line of vision.
Figure 6:
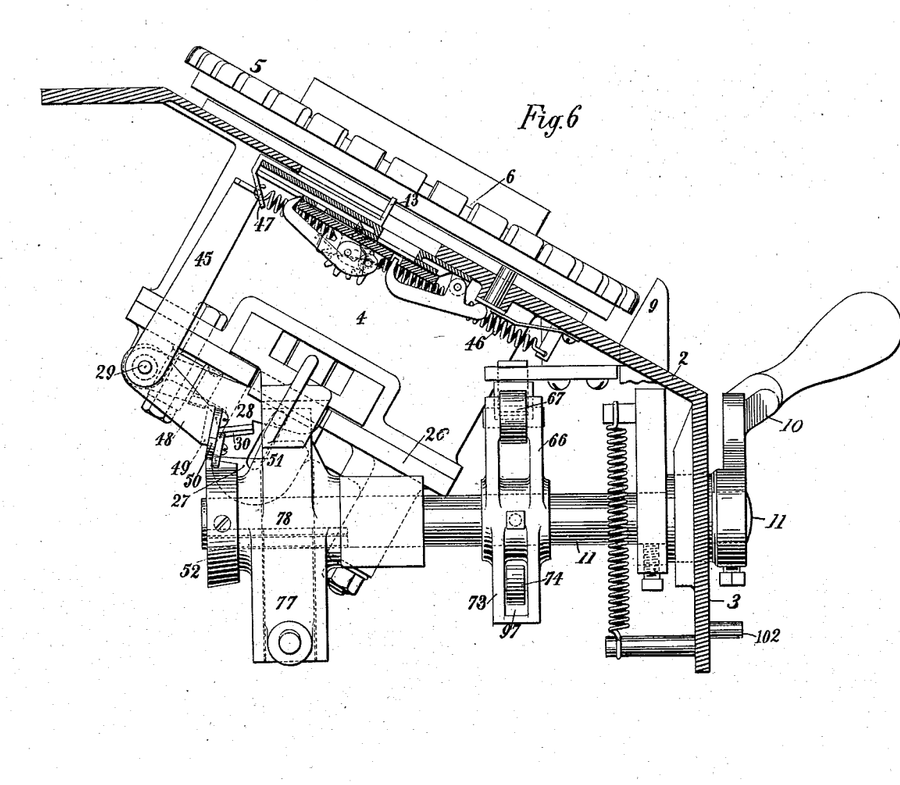
Fig. 6 is an end elevation, parts of the framework and of the vending apparatus being in section.
Figure 7:
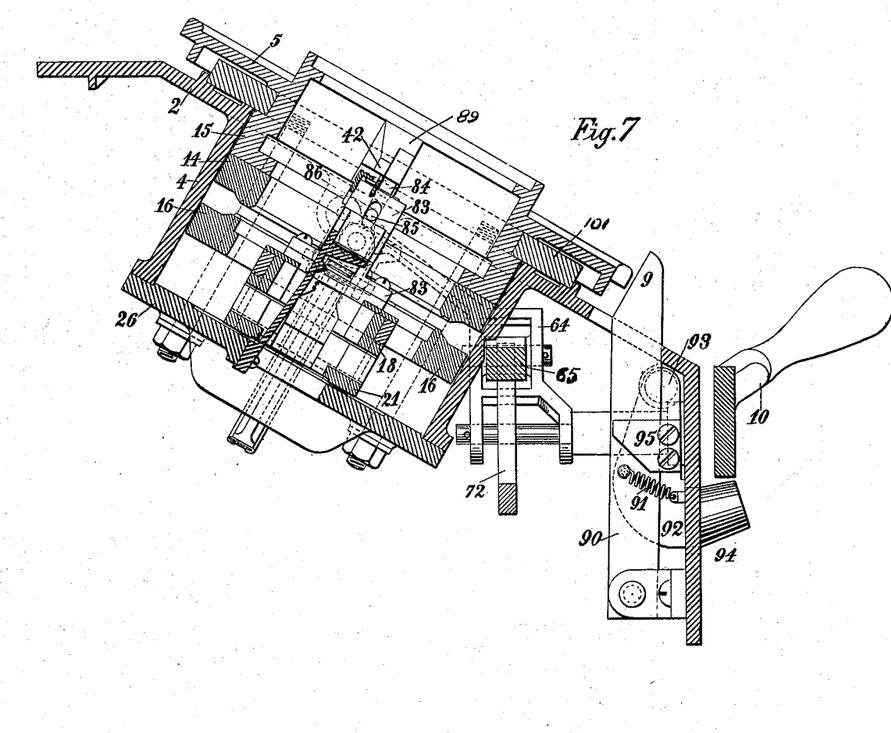
Fig. 7 is a central transverse vertical section taken on the line 7 7 of Fig. 1.

We will first describe those parts of the apparatus which are ordinarily exposed to view when the machine is combined with a coin-controlled device or vending apparatus and make reference particularly to Figs. 1, 2, and 6. 2 designates the top plate of the apparatus, which is preferably of metal and arranged to occupy an inclined position, as represented in Figs. 1 and 6. The inclination of the top is for the purpose of convenience in the manipulation of the apparatus, and except for convenience it might be otherwise disposed. The plate 2 is provided with a front vertically-disposed flange 3. The parts 2 and 3 constitute parts of a supporting and inclosing frame within which the principal operating parts of the mechanism are arranged. The other parts of the casing are not shown, but may be of any usual or approved construction. 5 indicates a ring, disk, or wheel, preferably of metal and rotatably supported above the top frame-piece 2 and constituting part of the holder and carrier for one of the dies. The edge of the disk or plate 5 is notched, as indicated at 6, and opposite the notches are indicated the letters of the alphabet and such other characters as it may be desired to employ in the printing or embossing of the strips or plates which the machine is to produce. The recesses 6 are arranged to receive a locking-dog 9, to be hereinafter more fully described, which operates to prevent the rotation of the wheel or disk during the embossing operations. The disk 5 has a centrally-raised portion 7, which is preferably hollow for the purpose of giving access to the interior of the mechanism. The opening into the central portion of the disk is preferably closed by a cover-plate 8, which may be secured in place in any desired way. In most of the views of the drawings this plate is omitted. 10 indicates the operating-handle, which is mounted upon a shaft 11, that projects outward through the front flange 3. These are the only portions of the apparatus which need to be exposed.

When the name-plate-printing mechanism is combined with a coin-controlled mechanism, certain parts of the latter will be exposed, and in the drawings we have represented the top plate as being perforated at 60, and below the aperture thus formed is arranged the coin-controlled mechanism, which may be of any usual or preferred construction and which we have not shown in detail and which need not be described. Suffice it to say that 13 indicates a sliding plate, which may be manually operated when the proper coin is placed in the recess 100 arranged therefor, and when this slide 13 is operated it sets the parts so that the embossing mechanism may be manipulated and the name-plate formed.

We will next describe the mechanism for embossing the strip of metal and the means for operating the embossing devices, and we refer particularly to Figs. 3, 4, 5, and 7. By reference to these views it will be seen that the plate 2 is formed with a cylindrical well-like portion 4, in which are arranged the dies and their carriers. The dies are of annular form and of a size in diameter to fit closely within the portion 4 of the framework. It will be understood that the characters upon one of the dies are in relief, while the corresponding characters upon the other die are in intaglio, and that the two dies occupy positions opposite to each other and normally supported a distance sufficient to permit a strip of metal which is to be embossed to be passed between them. The upper die 14 is supported by the cylindrical portion 15 of the upper-die carrier, to which it is secured in any suitable way. This carrier rests upon a bearing-ring 101, suitably seated on the top plate 2, between which and the exposed setting-ring of the die-holder it is situated. The lower die 16 rests loosely upon the upper face of a carrier or frame 18, which is arranged in the lower portion of the well 4 of the framework. The two dies are suitably connected, as by means of a pin 17, so that they will be rotated together; but the lower die is loosely mounted upon the pins, so that it may be freely moved vertically thereupon. The frame or carrier for the lower die is adapted to be moved toward and from the upper die, and it is provided upon its lower face with inclined or cam-like bearing-faces 19. A laterally-movable slide or frame 21 is arranged below the carrier 18 and is provided with inclined bearing-surfaces 22, which engage with the bearing-face 19 of the carrier 18. If the frame or slide 21 be reciprocated, the lower movable die 16 will be caused to approach toward or recede from the stationary die, according to the direction in which the slide is moved by reason of the engagement of the cam or inclined surfaces 19 and 22.

We will next describe the mechanism for reciprocating the slide 21. The end 23 of the slide is provided with jaws or abutments 24, between which there is arranged the end of an arm 25, mounted upon the shaft 11. The lower end of the cylindrical portion 4 of the framework is closed by a plate 26, which being securely bolted to the other parts of the framework becomes a portion thereof. This lower plate is provided with a flange or abutment 27, which is arranged adjacent to the end 23 of the slide 21. It is evident that the slide 21 must be moved a certain extent in order to bring the two dies sufficiently close together to cause them to emboss the strip of metal, and if the slide be moved a less extent though the dies may be caused to approach each other they will not approach sufficiently close together to affect the embossing of the strip. In order to prevent the unauthorized use of the apparatus, we employ means for limiting the extent to which the slide may be moved except at such times as when the parts are set for use. The preferred form of such device consists of an intercepter, which is adapted to limit or positively arrest the movement of the slide. The preferred form of this intercepter is that illustrated in the drawings and consists of a plate of metal 28, pivoted upon a shaft or pin 29 and arranged to be moved between a part of the slide and the flange portion 27 of the bottom plate of the framework. It is apparent by reference to Fig. 3, where the plate 28 is in an intercepting position, that the slide 21 can be moved to a limited extent only, and so long as the intercepter remains in this position the handle of the apparatus cannot be so moved as to cause the embossing or printing of a plate or the feeding of the strip.

31 indicates a spring bearing upon the plate 28 and tending to move it into the position shown in Fig. 3 to intercept or limit the movement of the slide 21.

Before the printing or embossing of the strip can take place it is necessary that the intercepting plate or arm 28 should be moved completely out of the path of the slide 21, and we will now describe the means for accomplishing this result. Before entering upon this description, however, it may be stated that the letters or characters are embossed upon the metal strip successively, the handle 10 being operated for each letter printed or embossed, and that such operation of the handle rocks the shaft 11, which in turn moves the arm 25, and this imparts motion to the slide, when the latter is free to be operated.

The intercepter is a valuable adjunct when the strip printing or embossing mechanism is combined with a coin-controlled device, and we have in the present embodiment of our invention shown means for moving the intercepter out of the path of the slide, which is controlled by a coin-controlled mechanism.

45 represents one arm of a lever which is fulcrumed upon the shaft 29. This arm has a portion which is situated in the path of a projecting part 47 of the slide 13 of the coin-controlled device, so that when the proper coin is inserted and the slide 13 is moved the projection 47 thereof will engage with the arm 45 and operate the lever. A relatively strong spring 46 is connected with the arm 45 and holds it normally in engagement with the projection 47. 48 is the other arm of the lever. It is provided with an angular flange 49, to which is pivoted latch 50, to which in turn is pivoted a dog or hooked catch 51. The free end of the dog 51 normally rests upon the periphery of a disk 52, mounted upon the shaft 11. This disk is notched, and the notch formed therein engages with the hooked end of the dog 51 under conditions which we will presently describe.

The portion of the arm 48 to which the latch 50 and the dog 51 are attached is situated adjacent to the face of the intercepter 28, and the lower end of the latter is formed with a flange or rib 30, with which the pivoted latch 50 engages under certain conditions in the operation of the apparatus. The parts which we have last described are those which are used to move the intercepter from the path of the slide 21. When this intercepter has been moved out of the path of the die, it should be held out of such path until the nameplate is completely printed, and we will next describe the means we have invented for so holding the intercepter.

34 is an arm connected with the intercepter by a pin 33, which passes through an aperture 32 in the flange 27 of the bottom plate of the framework. The arm 34 is provided with a shoulder or offset 35, so that it may serve as a catch, the offset portion being adapted to engage with a shoulder 37, which projects from a bracket 38, rigidly attached to a suitable stationary portion of the framework, as to the bottom plate 26. A spring 36 is connected with the arm 34 and tends to draw the offset portion 35 to engagement with the shoulder 37, and thus cause a locking of the intercepter.

Figure 4:
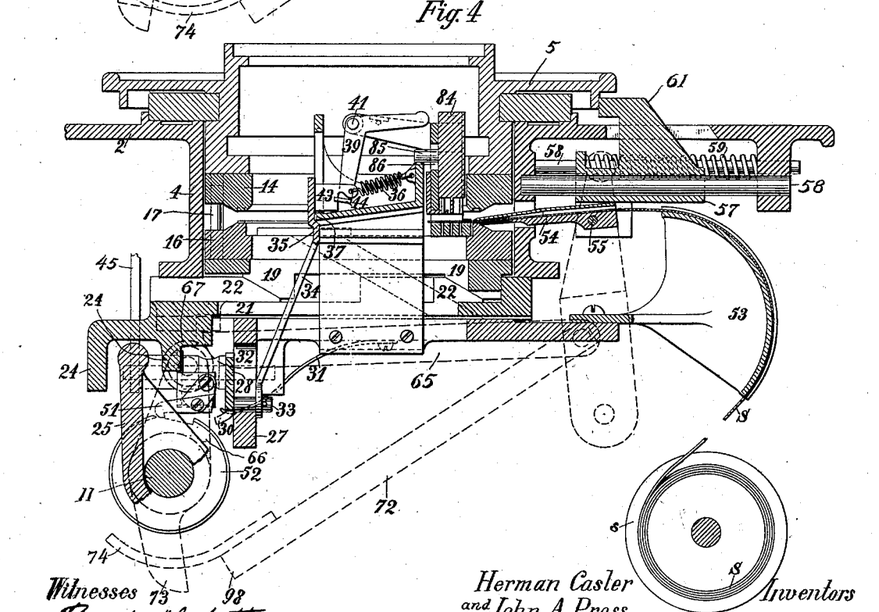

It will be evident from an examination of the drawings that if the intercepting-plate 28 be depressed from its intercepting position (shown in Fig. 3) to the position shown in Fig. 4 it will carry the catch-arm 34 downward with it until the offset portion 35 thereof comes into engagement with the stationary shoulder 37, and the spring 36 will cause a catching or locking of the parts. By this means the parts are held in position to permit the embossing action to take place.

It is necessary that provision should be made to release the catch 34 after the nameplate has been produced and allow the intercepter to come back into the position shown in Fig. 3, and we will now describe automatic means which we prefer to employ for tripping the catch.

Figure 5:
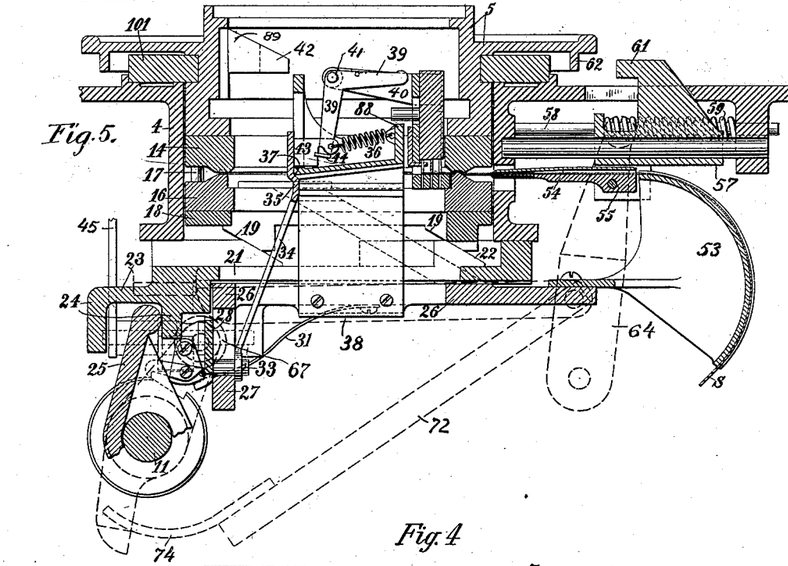

39 represents an angular or bell-crank lever, pivoted at 41 in a bracket 40, which is suitably supported from the die-carrier 18. This lever has a heel or extension 44, which is arranged to engage with a contact-piece 43, carried by the upper end of the catch-arm 34 when the arm is depressed and in a position to hold the intercepter out of the path of the slide 21, as represented in Figs. 4 and 5. The lever 39 is mounted freely upon its pivot 41, and being light it freely moves its heel over the contact-piece 43 without imparting any movement to the latter as the lever is raised and lowered at each reciprocation of the lower-die carrier. The upper-die carrier has an arm 42 projecting inward from the cylindrical portion 15 thereof and so disposed that when the disk 5 is turned into the position for completing the formation of the name-plate—$i. e.$, for the cut-off stroke, as indicated by the word "Finish" on the indicator—the said arm lies directly over the upper free end of the lever 39. It follows that when the carrier 18 is next lifted the lever 39 is rocked on its fulcrum and the heel 44 moves the catch-arm out of engagement with the abutment 37. This takes place because the fulcrum of the pivot is carried upward, while the free end of the lever is arrested by the arm 43, which lies directly above it. This tripping position of the parts is indicated in Fig. 3.

A description of certain of the movements of the apparatus may now be set forth. In Fig. 3 is represented the position of the parts when the apparatus is in inoperative position—that is to say, when the intercepter is in position to prevent the dies from being forced together to emboss the strip of metal, this being the position which the parts should assume when the apparatus is not in use, the intercepter being held in this position by the spring 31. If now a coin be inserted and the slide 13 of the coin-controlled mechanism be moved, it will rock the lever 45 and lift the arm or lever 48 sufficiently high to carry the latch 50 above the flange 30 of the intercepter. The pivot of the latch 50 is so disposed that the latch acts by gravity and catches upon and becomes locked against the flange or shoulder 30. As has been stated, the lever 45 is acted upon by a spring 46, and the force of this spring being much greater than the force of the spring 31, which holds the intercepter up, it follows that as soon as the slide 13 is released the spring 46 will return the lever 45 48 to normal position, carrying the intercepting-plate 28 down into the lower position (represented in Figs. 4 5) and out of the path of the slide. The intercepter is held in this position by the catch-arm 34 and also by the latch 50 at the end of the lever-arm 48. At the first movement of the handle 10 the shaft 11 is rocked until the notched portion of the disk 52 comes below the hooked end of the catch-dog 51, which latter drops by gravity into the position to be engaged by the shoulder of the notch when the handle is moved back and the oscillation of the shaft completed. The engagement of the disk with the catch causes the latter to be carried along with the disk, and this in turn disengages the latch 50 from the flange or projection 30, leaving the intercepter held only by the catch-arm 34. The strip of metal or other material which is fed between the dies by mechanism which we will presently describe may now be embossed a letter or character at a time, the strip being fed forward with a step-by-step motion. It will be understood that the setting-disk 5 is turned to bring the proper letters or characters one by one opposite the strip S, where a movement of the shaft 11 causes them to be impressed upon the strip. The characters upon the setting-disk being arranged opposite the notches 6 assist the operator in properly setting the parts. It will be seen by reference to Fig. 2 that opposite one of the notches 6 is arranged the word "Space" and that opposite another notch is arranged the word "Finish." When the notch opposite to which is the word "Space" is brought opposite to the setting position, the dies will not print, but the strip will be fed, thus leaving a plain or unembossed space. The notch opposite to which is the word "Finish" is brought to the setting position after the strip has been completely embossed and it is desired to cut off the finished strip or name-plate. When the setting-disk is turned into this position, the parts are brought to the position indicated in Figs. 2, 3, and 7, with the projection 42, carried by the setting-disk, situated above the free end of the lever 39, so that when the dies are next brought together the lever will be rocked to disengage the catch-arm 34 in the manner already described, freeing the intercepter and allowing it to move under the influence of the spring 31 and be forced into a position to prevent a full movement of the slide 21.

We will next describe the mechanism which we have devised for feeding the strip of metal S from which the name-plates are produced. This strip may be mounted upon a reel $s$, arranged at any convenient point within the casing of the apparatus. It passes from this reel over a curved guide 53 to the feeder 54, which consists of a reciprocating device having a pair of jaws or fingers, between which the strip is adapted to pass freely, the jaws being disposed at a distance apart substantially equal to the thickness of the strip S. The feeder is pivoted at 55 to a carrier 57, which latter is mounted upon rods 58, along which it is free to slide. A spring 59 is mounted between a suitable projection carried by the carrier 57 and a part of the stationary framework and operates to force the carrier and the strip-feeder forward, or toward the dies. We prefer that the spring should be coiled about one of the rods 58. It will be seen particularly by reference to Figs. 9 and 10 that when the strip has been embossed the raised letters will prevent the strip from being moved backward through the feeder, and the embossed letters or characters are made to serve as stops with which the forward ends of the jaws or fingers of the feeder come into engagement as the feeder is moved forward. They insure that the strip shall be carried forward with the feeder, while leaving the feeder free to move backward over the strip on its return or backward movement. Of course other feeding devices might be used; but the one which we have described is of simple construction and obviates the necessity of providing means for positively gripping the blank or strip during the forward movement. The reciprocating carrier 57, to which the feeder is connected, is provided with a nose 61, which is adapted to come into engagement with a circular flange 62, carried by the setting-ring 5, and arrest the forward movement of these parts after they have moved far enough to give the ordinary feed for a single character.

It is sometimes desirable to give to the strip an unusually long forward movement as feed—as, for example, when a blank or "space" is to be left—and to provide for this we slot the flange 62 to allow the nose of the feeder-carrier to pass through the flange when a slot is brought opposite thereto. There are two of these slots 63, one of them being arranged to come opposite to the nose 61 whenever the setting-disk is brought to the position marked "Space" and the other whenever the setting-disk is brought to the position marked "Finish." It is evident that the strip or blank should be fed forward to a greater extent when there is to be formed a space between two characters than when no space is desired, and the construction which we have described permits this lengthened feed. It is likewise apparent, particularly by reference to Fig. 8, that a lengthened feed is desirable after the embossing of the strip has been completed and before the cutting-off dies are brought into operation.

As we have shown, the sliding and reciprocating carrier 57 is freely mounted upon the rods 58, so as to be moved forward under the action of the spring 59, when the parts of the mechanism are set to permit this, until the frame is positively arrested.

64 designates a lever through which the backward movement is imparted to the sliding carrier 57. This lever receives its motion from the main shaft 11 through peculiar mechanism, which we will now describe.

65 is a link pivotally connected at one end with the lever 64. Its outer or free end is sustained by a supporting-arm 70, which engages with a pin 71, carried by the link, the pin sliding freely over a straight portion of the support as the link is reciprocated. The outer free end of the link 65 is rounded or made cam shape, as indicated at 68. With this end of the link there engages intermittently a roller 67, carried by an arm 66, fixed to the rock-shaft 11. When the feeder-frame is in its forward position, as indicated in Fig. 4, the free end 68 of the link 65 is in the path of the arm 66 and is also situated below a stationary portion 69 of the framework. By reference to Figs. 1 and 4, where the parts now being described are represented in dotted lines, it is evident that when the arm 66 is moved in the direction of the arrow $a$, Fig. 1, the link 65 will be moved backward, carrying with it the lever 64, the carrier 57, and the feeder 54. As soon as the end of the link comes beyond the edge of the portion 69 of the framework the link is forced upward by reason of the engagement of the roller 67 with the rounded or cam-shaped end of the link. This causes a disengagement of the link 65 and the arm 66 which operates it, so that a further movement of the shaft 11 and the arm 66 may take place without moving the feeder-frame, and at the same time it causes a locking of the feeder in its retracted position. This locking of the feeder and its carrier takes place by reason of the fact that the spring 59 is under tension when the carrier is retracted, and hence holds the free end of the link 65 against the edge of the frame-piece 69 with sufficient force to cause a locking of the parts. The parts of the feeder are thus locked in their backward position during the time the embossing-dies are being operated. After the dies have completed their work and are again separated the feeder is to be unlocked and left in condition to feed the strip at the next movement of the handle and before the embossing-dies are operated. To unlock the feeder-frame, we have devised the following mechanism:

72 is a link pivotally connected with the lever 64 and arranged with its free end in position to be operated upon by an arm 73, carried by the main shaft 11.

74 is a curved tailpiece secured to the free end of the link 72 and passing through a slot 97 in the arm 73. The outer or free end 98 of the link 72 constitutes a stop or abutment with which the end of the arm 73 engages just before the operating-handle 10 comes to its upper position, or position of rest. It will be apparent that a movement of the arm 73 in the direction of the arrow $b$, Fig. 1, will impart a short movement to the link 72, and this in turn will rock the lever 64 in a backward direction and at the same time will free the link 65 from engagement with the part 69 of the framework. The link 65 is now free and will fall under the influence of gravity until arrested by the support 70, the parts assuming the position indicated in Fig. 1. The carrier is now unlocked at the point 68 69, but is locked in its backward position by the engagement of the arm 73 with the end 98 of the link 72. The feeder-frame is thus held retracted so long as the machine is not in use and the handle 10 is in its elevated position. When the handle is depressed, the arm 73 is immediately moved out of engagement with the end of the link 72, which frees the feeder-carrier, allowing it to be moved forward under the force of the spring 59. The complete forward movement of the feeder and its carrier takes place before the roller of the arm 66 comes into engagement with the end of the link 65 and also, it may here be noted, before the arm 25 begins to move the sliding frame which operates the movable embossing-die.

As has been already stated, the normal position of the operating-handle when the machine is not in use is the raised position, (indicated in Fig. 1,) and to hold the handle and the other parts of the apparatus in the position of rest we use a relatively strong spring 75, connected to an arm 76, carried by the main shaft 11.

In order to allow sufficient time to elapse for the feeding of the blank or strip and for the complete retraction or backward movement of the feeder before the embossing-dies are brought together, for the manifest reason of preventing the dies from catching and injuring the feeder, we prefer to provide a lost-motion connection between the shaft 11 and the feeder-slide for the movable dies. It will be seen by reference to Figs. 3, 4, and 5 that the space between the two contact-pieces 24 of the slide 21 is considerably greater than the thickness of that portion of the arm 25 which engages with these parts. It follows that a considerable motion is given to the arm before it begins to move the slide. We have, however, found it best to provide other means for allowing a certain amount of lost motion, and this we arrange for by the peculiar connection between the shaft 11 and the arm 25.

78 indicates the hub of the arm 25. It is loose upon the shaft 11 and is connected to the latter by a key 80, the end of which enters a slot 79, formed in the shaft. The key 80 is supported by an extension 77 of the arm 25. These parts occupy the position indicated in Fig. 3 when the machine is at rest. The first movement of the handle 10 turns the shaft 11 without imparting any movement to the arm 25, which only begins to move when the rear shoulder of the slot 79 comes into engagement with the key 80. The arm 25 makes a considerable advance, as represented by Figs. 3, 4, and 5, before it operates the slide 21, so that the embossing-dies are not brought to the embossing position until the handle 10 reaches the downward limit of its movement.

We will next describe the dies which are used to cut off the finished name-plate (represented at T in Fig. 8) from the strip S.

81 indicates the lower cut-off die. This die is preferably supported in a frame or holder 83, which is securely attached to the carrier 18 for the lower or movable embossing-die. The upper cut-off die 82 is carried by a slide 84, loosely supported in the frame or holder 83. The slide is provided with a pin 85, which extends outward through a slot 86, formed in the holder 83 and so disposed as to engage with a stationary stop-piece 88, which serves to limit the downward movement of the slide and its die. These dies are not only provided with cutters which operate to sever the embossed plate from the strip S, but also with pin-like dies 87, which are adapted to form the small apertures t in the ends of the plates, which furnish means for attaching the finished tag to a box or the like. There are two of these pin-like dies, and they are arranged upon opposite sides of the cut-off dies, and one of them forms the aperture in the rear end of the completed name-plate, while the other forms an aperture in the front end of the portion of the strip which is to constitute the next name-plate produced.

89 indicates a rigid L-shaped abutment which is carried by the carrier for the upper embossing-die and projects inward from the cylindrical portion 15 thereof. This abutment is so disposed as to lie directly over the end of the slide 84, which carries the upper cut-off die, and down almost to the plane of the upper end of the slide when it occupies its lower position—that is, with the pin 85 resting upon the stop-piece 88.

From what has been stated it is apparent that the lower cut-off die moves up and down with the lower embossing-die 16. The strip of material being operated upon is carried by these dies upward against the upper embossing-die and the upper cutting-off die; but as the latter is carried by a slide which is free to move in its holder 83 it follows that the cut-off dies are inoperative during the embossing of the strip, the upper die merely sliding freely in advance of the strip when the dies approach each other. When the plate has been completely embossed and it is desired to cut it off, the setting-wheel is turned to the position indicated by the word "Finish," this being the abutment 89 above the end of the slide 84 of the upper cut-off die, which serves to lock the slide against any movement in its holder, this position of the part being indicated in Fig. 3. If now the handle 10 be depressed and the frame 18, carrying the lower printing and cut-off dies, be lifted, the strip will be carried toward the upper dies, and the upper cut-off die being held stationary and rigidly by the abutment 89 it follows that as the two dies come together the strip will be punched and cut off.

It has heretofore been stated that the setting-ring is locked by means of the dog 9, engaging with one of the notches 6, whenever the handle 10 is depressed to cause any operation of the mechanism. It now remains to describe the mechanism for operating this locking-dog. It is formed by the exposed end of a lever 90, which extends through a suitable slot in the top plate 2. A spring 91 operates upon the lever 90 and tends to hold it in a retracted position with the dog free from the setting-ring. The lever 90 is operated by another lever 92, pivoted at 93 and provided with a contact-stud 94, which projects outward through an opening in the flange portion 3 of the top plate and into the path of the lever 10. The surface of the stud with which the lever engages is so inclined that when the lever comes into engagement therewith the stud is forced inward and the locking-dog is moved into engagement with the setting-wheel. The lever 92 carries a guard-piece 95, which operates to maintain the two levers 90 and 92 in proper relative working positions.

We prefer to construct the operating-lever 10 with a projection 96, which is arranged to overlie the stud 94 when the lever is in its lowermost position. By thus constructing the lever we are enabled to insure that the stud shall be held in and the parts locked during the entire working movement of the handle without making the latter unduly large.

We will now describe the operation of the machine when constructed as illustrated in the drawings and as herein described. It may be assumed that the parts are in normal inoperative position, the handle 10 being raised and the intercepter in place to prevent the movement of the slide which operates the dies. A person desiring a name-plate like that, for instance, represented in Fig. 8 will first place the proper coin in the receiving-aperture 100 of the coin-controlled mechanism and operate the slide 13. This will by means of the mechanism and in the manner already described withdraw the intercepter and lock the same by the catch arm or bar 34. The machine is now in position for use. The setting-disk should first be turned to the starting position—that is to say, to that position in which the notch 6 opposite to which is the word "Start" is brought in front of the locking-dog 9. When the setting-disk is turned to this position, the abutment 89 lies directly above the upper end of the slide 84, which carries the upper cut-off die. The portions of the embossing-die which are arranged on opposite sides of the strip when the parts are thus set are blank. The handle is now depressed, and this operates first to lock the setting-disk and the parts connected therewith, and thereafter to operate the cut-off dies, the abutment being over the end of the slide, as stated. The reason for making this first movement is as follows: It might be that the previous user of the apparatus had partly printed or embossed a plate, but had never finished it by severing it from the main strip S. In such event should the subsequent manipulator of the apparatus begin the printing or embossing of the strip without first operating the apparatus in such way as to work the cut-off dies he would find that his plate when delivered contained not only what he had printed, but also what had been printed by the party using the machine last before, and the result would be a plate worthless to the person who received it. The handle having been operated at the "start" position the name which it is desired to appear upon the dial plate or indicator may be spelled out a letter at a time, the setting-wheel being turned to the letter to be printed, the handle then operated and returned to the position of rest, the wheel next set for the succeeding letter, the handle again operated, and so on. Each manipulation of the handle causes first a forward feeding of the metal strip and then a printing of the letter or character. Should it be desired to have a space between any two characters, the wheel is set to the "space" position and the handle operated as in other cases. When the wheel is thus set, one of the recesses or notches 63 in the flange 62 is brought opposite to the nose of the sliding feeder-carrier and a long feed of the strip is insured. When the setting-wheel is in this position, blank or plain portions of the embossing-dies are presented to the strip, so that no characters are formed on the strip. The printing of the plate having taken place the setting-wheel is turned to the "finish" position and the handle operated. This operation of the handle results in the operation of the cut-off and punching dies and also of the throw-off or trip mechanism which releases the catch of the intercepter. As the handle now comes to the position of rest the intercepter moves into the position to lock the slide that operates the dies. The completed and severed plate is delivered through any suitable opening in the case. As we have not shown a complete case, such opening which forms no part of our present invention is not illustrated.

It will be seen by reference to Figs. 2 and 5 that the catch-arm 34, which holds the intercepter out of the path of the slide 21, lies in the path of the forward end of the embossed strip after it leaves the embossing-dies. The distance of this arm from the printing portion of the dies is sufficiently great to allow a name-plate of ordinary length or even of unusually great length to lie between it and the printing-dies; but should a person seek through mischief or other reason to continue to operate the apparatus to an unwarranted extent the end of the strip will presently strike the arm 34 and trip the intercepter, after which the further operation of the apparatus, save for the actuation of the cutting-dies, cannot take place until another coin has been placed in the coin-actuated mechanism.

A stop 102 may be placed on the frame or casing of the machine in position to limit the downward movement of the handle 10.

It is apparent that many of the parts of the mechanism shown could be used without the association and combination of other parts herein shown and described without altering the principle of our invention. Thus the coin-controlled mechanism could be entirely dispensed with and the intercepter operated manually, and it might be arranged to be locked by means of a padlock to prevent the unauthorized manipulation of the machine. Again, the intercepter might be entirely dispensed with and the other parts of the apparatus used as a continuous strip-embossing or name-plate forming apparatus.

We have in the drawings and throughout this specification referred to the means which mark the name-plate as "embossing-dies." It is evident, however, that perforating-dies or printing devices might be used in lieu of embossing-dies and that such devices would be the equivalents in many respects of the embossing-dies which we prefer to use. The invention is capable of use upon other surfaces besides metal strips.

We have employed the term "intercepter" to denote a part of an organized apparatus whose function is to prevent the working of some part essential to the operation of the complete machine or apparatus. We have shown the intercepter as consisting of a single part—a pivoted plate or arm—and have shown it as being arranged to stop or intercept the operation of the slide which directly works the carrier for the movable dies. However, this feature of our invention and the apparatus might be otherwise constructed and arranged without departing from the principle of our invention so long as it performs the functions which have been described as appertaining thereto.

We do not intend to limit ourselves in any way to the devices or arrangements of parts set forth, as they are capable of very wide variation within the terms of our claims.

What we claim as our invention is—

1. The combination of a pair of annular embossing-dies, a rotatable carrier for the dies, a feeder on one side of the annular dies for passing a strip of material between the dies, cut-off dies for severing the embossed strip, arranged on the other side of the annular embossing-dies and stationary relative to the rotation thereof, and means for actuating the cut-off dies at will, as set forth.

2. The combination of a pair of annular embossing-dies, a rotatable carrier for the dies, a feeder outside of the annular dies for passing a strip of material between the dies, cut-off dies for severing the embossed strip, arranged inside the annular embossing-dies and stationary relative to the rotation thereof, means for engaging the cut-off dies when the annular dies are rotated to a certain position, and means for actuating said annular dies to operate the cut-off dies, as set forth.

3. The combination of a pair of annular embossing-dies, a rotatable carrier for the dies, a feeder outside of the annular dies for passing a strip of material between the dies, cut-off dies for severing the embossed strip, arranged inside the annular embossing-dies and stationary relative to the rotation thereof, a projection on one of the annular dies to engage the cut-off dies when the said annular dies are rotated to a certain position, and means for actuating the annular dies to operate the cut-off dies, as set forth.

4. The combination of a set of dies, a reciprocating feeder engaging a strip during the forward reciprocation to advance the same lengthwise between the dies and passing idly along the strip during the backward reciprocation, a stop carried by the feeder, moving parallel to the strip and in unison therewith, and means for intercepting said stop to limit the movement of the feeder, as set forth.

5. The combination of a set of rotatable dies, an exposed setting-disk for rotating the dies, a reciprocating feeder engaging a strip of material to advance the same between the dies, a stop carried by the feeder, moving parallel to the strip and in unison therewith, arranged to be intercepted by the edge of the exposed setting-disk to limit the movement of the feeder, and one or more notches in the edge of the setting-disk, whereby at certain positions of the disk the stop will enter a notch to feed a greater amount of the strip forward, as set forth.

6. The combination of a set of dies, a carrier therefor having a circular exposed setting-disk provided with a flange which is notched at certain points, and a reciprocating feeder for a strip of material to be operated upon by the dies, having a projecting part, moving with and parallel to the feeder and the strip adapted to engage with the said flange of the setting-disk, or to pass through the notches therein accordingly as the disk is set, in order to feed the strip to a greater or less extent, substantially as described.

7. The combination of a set of embossing-dies, devices for operating the dies, a feeder for feeding a strip of material between the dies and a lock for holding the feeder in its backward position while the dies are being operated, substantially as described.

8. The combination of a set of embossing-dies, means for operating the dies, a feeder for feeding a strip of material between the dies, a lock for holding the feeder in its backward position while the dies are being operated, and means for releasing the feeder from said lock after the dies have operated, substantially as described.

9. The combination of a set of dies, means for operating the dies, a reciprocating feeder for feeding a strip of material between the dies, a spring arranged to move the feeder in its forward direction, a positively-operating mechanism for moving the feeder backward, and a lock for holding the feeder in its backward position, substantially as described.

10. The combination of a set of embossing-dies, means for operating the dies, a reciprocating feeder for feeding a strip of material between the dies, positively-actuating means for moving the feeder in a backward direction, a spring for moving the feeder in a forward direction, a lock for holding the feeder in its backward position, and a trip for releasing the feeder from the lock and allowing it to be moved forward by the spring, substantially as described.

11. The combination of a set of embossing-dies, means for operating the dies, a reciprocating feeder arranged to feed a strip of material between the dies, a lever arranged to move the feeder, a locking-link 65 connected with the said lever, a stop or abutment with which the said link engages when the feeder is moved back, whereby the feeder is locked, an operating-arm arranged to engage with and move the link, a tripping-link 72 connected with the lever, and an arm 73 arranged to engage with the tripping-link to release the link 65 from its locking position, substantially as described.

12. In a machine for embossing a strip of material, the combination of a set of embossing-dies and a feeder for feeding the strip between the dies, having a set of jaws arranged a distance apart substantially equal to the thickness of the strip whereby when a letter is embossed the struck-up portion of the material is adapted to operate as an abutment with which the jaws of the feeder may engage, substantially as described.

13. The combination of a set of embossing-dies, means for operating the dies, means for feeding a strip of material between the dies, an intercepter arranged to prevent the operation of the dies, and a catch device for holding the intercepter out of operative position, the said catch device being disposed in the path of the embossed strip, whereby the intercepter will be tripped by the strip when it has been advanced a certain distance beyond the dies, substantially as described.

14. The combination of embossing-dies, means for operating the dies, a feeder for feeding a strip of material between the dies, a power-shaft, connections therefrom to the feeder, a device loosely mounted on the shaft to actuate the die-operating means, and a key carried by the loosely-mounted device extending into a transverse slot in the shaft, whereby the die-operating means will not be actuated till the feeding devices have completed their movements, as set forth.

15. The combination of a set of embossing-dies, means for feeding a strip of material between the dies, means for reciprocating one of the embossing-dies, the cut-off dies comprising a die arranged to reciprocate with the reciprocating embossing-die, and another die opposed thereto and mounted loosely in its carrier or holder, and means for locking the last-named cut-off die in its holder at will, whereby a movement of the reciprocating dies will cause the strip to be severed, substantially as described.

16. The combination of a set of embossing-dies, a means for setting the dies, means for reciprocating one of the dies toward and from the other dies, a pair of cut-off dies, one of which is arranged to be reciprocated with the reciprocating embossing-die and the other of which is free to slide in its carrier or holder, and a rigid abutment carried by the setting mechanism and arranged to be moved into engagement with the sliding cut-off die and to lock it in its holder, substantially as described.

HERMAN CASLER.
JOHN A. PROSS.

Witnesses:
 Jos. S. Pickel,
 H. D. Pomeroy.